United States Patent
Kanehara et al.

(10) Patent No.: US 6,432,012 B1
(45) Date of Patent: *Aug. 13, 2002

(54) BELT FOR CONTINUOUSLY VARIABLE TRANSMISSION

(75) Inventors: Shigeru Kanehara; Toru Yagasaki, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,932

(22) PCT Filed: Mar. 8, 1999

(86) PCT No.: PCT/JP99/01108

§ 371 (c)(1), (2), (4) Date: Oct. 16, 2000

(87) PCT Pub. No.: WO99/54639

PCT Pub. Date: Oct. 28, 1999

(30) Foreign Application Priority Data

Apr. 17, 1998 (JP) .............................................. 10-107345

(51) Int. Cl.$^7$ ................................................ F16G 5/16
(52) U.S. Cl. ......................................................... 474/242
(58) Field of Search ................................ 474/242, 245, 474/240, 241

(56) References Cited

U.S. PATENT DOCUMENTS

| | | | | |
|---|---|---|---|---|
| 4,832,671 A | * | 5/1989 | Satoh | 474/242 |
| 6,090,004 A | * | 7/2000 | Kanehara et al. | 474/242 |
| 6,217,472 B1 | * | 4/2001 | Fujioka et al. | 474/242 |
| 6,273,837 B1 | * | 8/2001 | Yoshida et al. | 474/242 |

FOREIGN PATENT DOCUMENTS

| | | |
|---|---|---|
| JP | 57-57938 | 4/1975 |
| JP | 61-116145 | 6/1986 |
| JP | 63-203945 | 8/1988 |
| JP | 2-154834 | 6/1990 |

* cited by examiner

Primary Examiner—David A. Bucci
Assistant Examiner—Timothy McAnulty
(74) Attorney, Agent, or Firm—Arent Fox Kintner Plotkin & Kahn, PLLC

(57) ABSTRACT

In a belt for a continuously variable transmission including a large number of metal elements carried on metal ring assemblies each of which is comprised of a plurality of endless metal rings laminated one on another, the amplitude $\sigma a_1$ of a total stress on the inner circumferential surface of the innermost metal ring is larger than the amplitude $\sigma a_n$ of a total stress on the inner circumferential surfaces of the other metal rings, and a maximum value of a tensile stress on the inner circumferential surface of the innermost metal ring is larger than a maximum value of a tensile stress on the inner circumferential surfaces of the other metal rings. Therefore, a compressive residual stress is applied to the inner circumferential surface of the innermost metal ring used under the severest condition, and the middle value $\sigma m_1$ of the amplitude $\sigma a_1$ of the stress on the innermost metal ring is brought close or equal to 0. Thus, the middle value of the stress on the inner circumferential surface of the innermost metal ring which is most liable to be broken can be brought close to 0, thereby enhancing the durability of the entire metal ring assembly.

2 Claims, 10 Drawing Sheets

FIG.6B SERVICE STATE

FIG.6A FREE STATE

BELT FOR CONTINUOUSLY VARIABLE TRANSMISSION

FIELD OF THE INVENTION

The present invention relates to a belt for a continuously variable transmission including a large number of metal elements carried on metal ring assemblies each of which is comprised of a plurality of endless metal rings laminated one on another.

BACKGROUND ART

When a metal belt of a continuously variable transmission is clamped in V-faces of a drive pulley and a driven pulley, a tension is generated in the metal belt. This tension is varied by a driving force and a braking force received from both the pulleys and for this reason, the tensile stress on each of the metal rings is varied periodically with traveling of the metal belt. The traveling metal belt is bent at a pulley-wound zone and drawn out in a chord portion between the pulleys and hence, a bending stress on each metal ring is also varied periodically. As a result, a total stress (a sum of the tensile stress and the bending stress) applied to each of the metal rings is varied periodically with one rotation of the metal belt being as one cycle.

A belt for a continuously variable transmission has been proposed in Japanese Patent Application Laid-open No. 57-57938, in which a compressive residual stress is applied to an outer circumferential surface of each of the metal rings of a metal ring assembly, and a tensile residual stress is applied to an inner circumferential surface of the metal ring, whereby the middle value of the amplitude of the periodically varied stress (the middle value of the stress) on each of metal rings is brought as close to 0 as possible to prolong the fatigue life.

The innermost metal ring of such metal ring assembly abuts against a saddle surface of the metal element, while the inner circumferential surfaces of the metal rings other than the innermost metal ring abut against the outer circumferential surfaces of the other metal rings, respectively, and hence, friction coefficients of abutment portions of the innermost one and the other metal rings are of different values. Specifically, it has been ascertained by the actual measurement that a friction coefficient of the inner circumferential surface of the innermost metal ring abutting against the saddle surface of the metal element is larger than a friction coefficient of the inner circumferential surface of the metal ring other than the innermost metal ring. As a result, as will be described in detail in connection with an embodiment hereinafter, the amount of variation in tension of the innermost metal ring (a difference between the maximum and minimum values of a tension in one cycle) is larger than the amount of variation in tension of the other metal rings.

In the above conventional belt, however, the compressive residual stress is applied to the outer circumferential surfaces of all the metal rings and the tensile residual stress is applied to the inner circumferential surfaces of all the metal rings, without discrimination between the innermost metal ring and the other metal rings. Therefore, there is a problem that the durability of the entire metal belt is limited by the durability of the innermost metal ring used under a severe condition with a large amount of variation in tension. The point of start of the actual breakage is on the inner circumferential surface of the innermost metal ring and for this reason, an attention must be paid to the amplitude σa and middle value σm of the stress on the inner circumferential surface of the metal ring rather than the outer circumferential surface. The middle value σm of the stress is positive (tension) and hence, there is a problem that if the tensile residual stress is applied to the inner circumferential surface of the metal ring, the middle value σm of the stress is increased, resulting in a reduced life.

DISCLOSURE OF THE INVENTION

The present invention has been accomplished with the above circumstances in view, and it is an object of the present invention to prolong the fatigue life of the inner circumferential surface of the innermost metal ring which is most liable to be broken, thereby enhancing the durability of the entire metal ring assembly.

To achieve the above object, according to the present invention, there is provided a belt for a continuously variable transmission, comprising a large number of metal elements carried on metal ring assemblies each of which is comprised of a plurality of endless metal rings laminated one on another, characterized in that a compressive residual stress is applied to at least an inner circumferential surface of an innermost one of the metal rings which is in contact with a saddle surface of the metal element, the compressive residual stress applied to the innermost metal ring being larger than a compressive residual stress applied to the metal rings other than the innermost metal ring.

In addition to the above arrangement, there is provided a belt for a continuously variable transmission, wherein the compressive residual stress is applied to at least the inner circumferential surface of the innermost metal ring, so that a fatigue life defined by an amplitude $\sigma a_1$ and a middle value $\sigma m_1$ of a stress on the inner circumferential surface of the innermost metal ring is equal to a fatigue life defined by an amplitude $\sigma a_n$ and a middle vale $\sigma m_n$ of a stress on the inner circumferential surfaces of the metal rings other than the innermost metal ring.

The function and effect according to the present invention are as follows.

The friction coefficient of the inner circumferential surface of the innermost metal ring which is in contact with the saddle surface of the metal element is larger than the friction coefficient between the metal rings which are in contact with one another and hence, the amount of variation in tension on the innermost metal ring is larger than the amount of variation in tension on the other metal rings, and the amplitude of the stress on the innermost metal ring attendant on the variation in tension is larger than the amplitude of the stress on the other metal rings. As a result, when the total stress resulting from the addition of the bending stress on the metal ring to the tensile stress on the metal ring is considered, the amplitude of the total stress on the inner circumferential surface of the innermost metal ring is larger than the amplitude of the total stress on the inner circumferential surfaces of the other metal rings, and the middle value of the stress on the inner circumferential surface of the innermost metal ring is larger than the middle value of stress on the inner circumferential surfaces of the other metal rings.

Therefore, the compressive residual stress is applied to the inner circumferential surface of the innermost metal ring used under the severest condition, and the middle value of the amplitude of the stress on the innermost metal ring is brought close to or equal to 0 (zero). Thus, the difference between the maximum value of the tensile stress and the maximum value of the compressive stress applied to the inner circumferential surface of the innermost metal ring can be decreased to enhance the durability of the innermost metal ring, thereby prolonging the life of the entire metal ring assembly.

Particularly, by setting the value of the compressive residual stress such that the fatigue life of the innermost metal ring is equal to the fatigue life of the other metal rings, the life of the entire metal ring assembly can be prolonged most effectively.

BRIEF DESCRIPTION OF THE DRAWINGS

FIGS. 1 to 10 show an embodiment of the present invention.

BEST MODE FOR CARRYING OUT THE INVENTION

The embodiment of the present invention will now be described with reference to the accompanying drawings.

Figure 1:
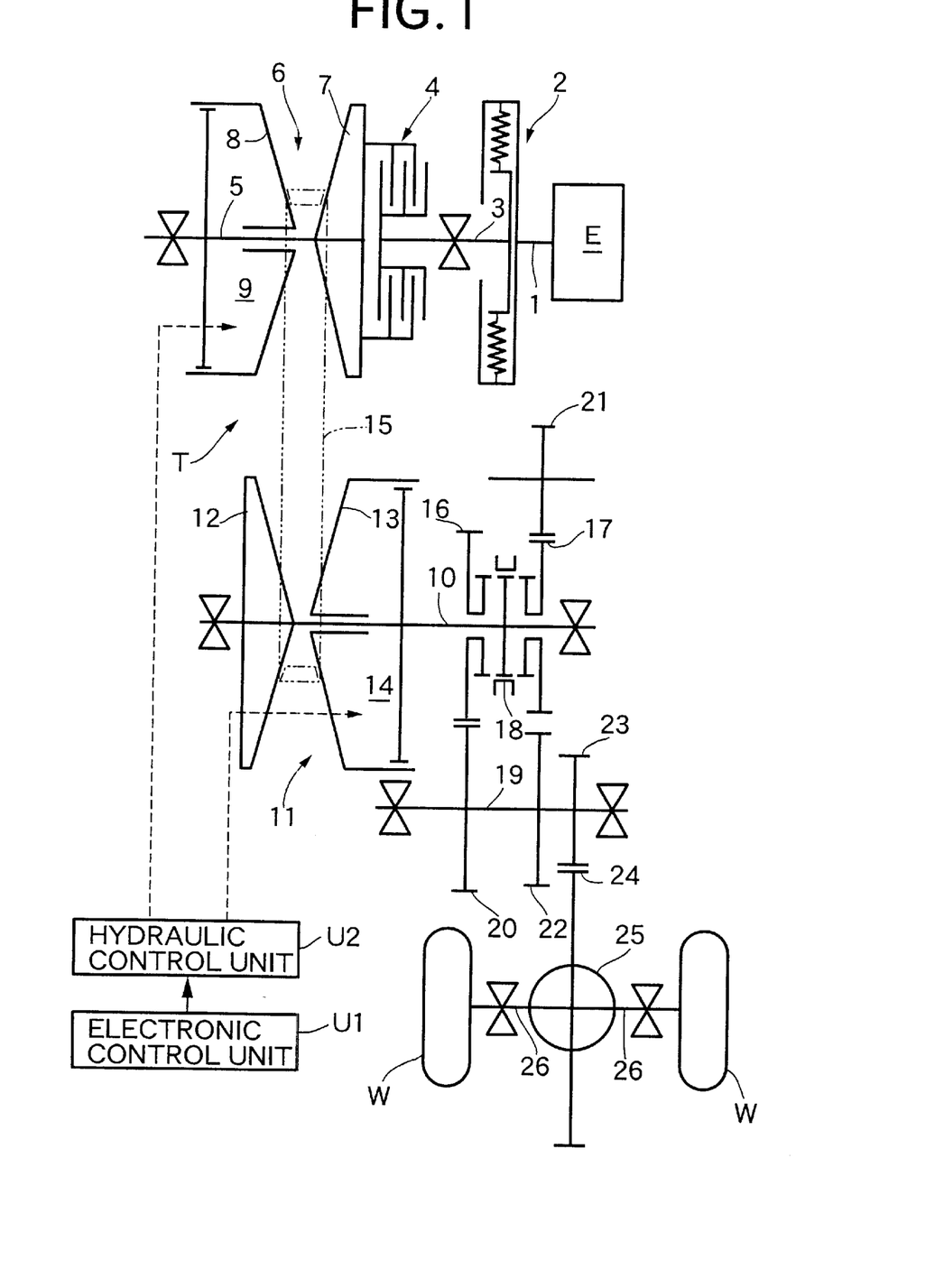
FIG. 1 is a skeleton illustration of a power transmitting system of a vehicle having a continuously variable transmission mounted thereon.

FIG. 1 shows the skeleton structure of a metal belt-type continuously variable transmission T mounted on an automobile. An input shaft 3 is connected to a crankshaft 1 of an engine E through a damper 2 and also connected to a drive shaft 5 of the metal belt-type continuously variable transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased toward the stationary pulley half 7 by a hydraulic pressure applied to an oil chamber 9.

Figure 2:
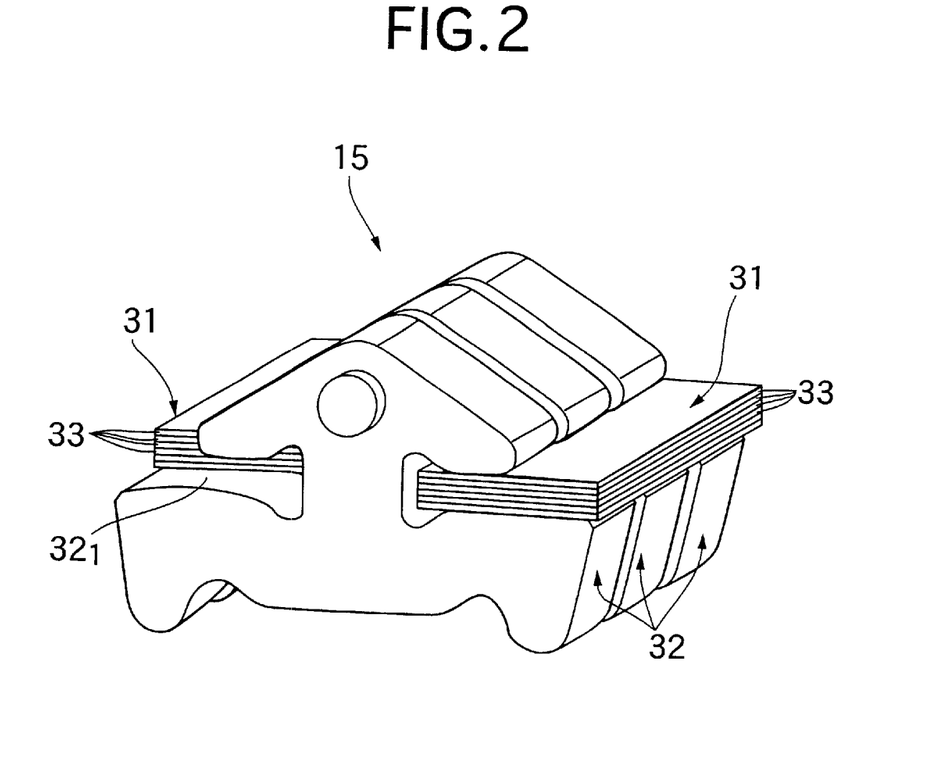
FIG. 2 is a partial perspective view of a metal belt.

A driven pulley 11 is mounted on a driven shaft 10 disposed in parallel to the drive shaft 5, and includes a stationary pulley half 12 secured to the driven shaft 10, and a movable pulley half 13 which is movable toward and away from the stationary pulley half 12. The movable pulley half 13 is biased toward the stationary pulley half 12 by a hydraulic pressure applied to an oil chamber 14. A metal belt 15 comprising a large number of metal elements 32 supported on a pair of left and right metal ring assemblies 31, 31 is wound around the drive pulley 6 and the driven pulley 11 (see FIG. 2). Each of the metal ring assemblies 31 comprises twelve metal rings 33 laminated one on another.

A forward drive gear 16 and a backward drive gear 17 are rotatably carried on the driven shaft 10 and are capable of being selectively coupled to the driven shaft 10 by a selector 18. Secured to an output shaft 19 disposed in parallel to the driven shaft 10 are a forward driven gear 20 meshed with the forward drive gear 16, and a backward driven gear 22 meshed with the backward drive gear 17 through a backward idle gear 21.

The rotation of the output shaft 19 is inputted to a differential 25 through a final drive gear 23 and a final driven gear 24 and then transmitted from the differential 25 through left and right axles 26, 26 to driven wheels W, W.

A driving force from the engine E is transmitted through the crankshaft 1, the damper 2, the input shaft 3, the starting clutch 4, the drive shaft 5, the drive pulley 6, the metal belt 15 and the driven pulley 11 to the driven shaft 10. When a forward travel range is selected, the driving force of the driven shaft 10 is transmitted through the forward drive gear 16 and the forward driven gear 20 to the output shaft 19 to move the vehicle forwards. When a backward travel range is selected, the driving force of the driven shaft 10 is transmitted through the backward drive gear 17, the backward idle gear 21 and the backward driven gear 22 to the output shaft 19 to move the vehicle backwards.

In this case, the shift ratio is continuously regulated by controlling the hydraulic pressure applied to the oil chamber 9 in the drive pulley 6 and the oil chamber 14 in the driven pulley 11 in the metal belt-type continuously variable transmission T by a hydraulic pressure control unit $U_2$ which is operated by the command from an electronic control unit $U_1$. More specifically, if the hydraulic pressure applied to the oil chamber 14 in the driven pulley 11 is increased relative to the hydraulic pressure applied to the oil chamber 9 in the drive pulley 6, the groove width of the driven pulley 11 is decreased, leading to an increased effective radius. According to this, the groove width of the drive pulley 6 is increased, leading to a decreased effective radius. Therefore, the shift ratio of the metal belt-type continuously variable transmission T is continuously varied toward "LOW". Reversely, if the hydraulic pressure applied to the oil chamber 9 in the drive pulley 6 is increased relative to the hydraulic pressure applied to the oil chamber 14 in the driven pulley 11, the groove width of the drive pulley 6 is decreased, leading to an increased effective radius. According to this, the groove width of the driven pulley 11 is increased, leading to a decreased effective radius. Therefore, the shift ratio of the metal belt-type continuously variable transmission T is continuously varied toward "TOP".

Figure 3:
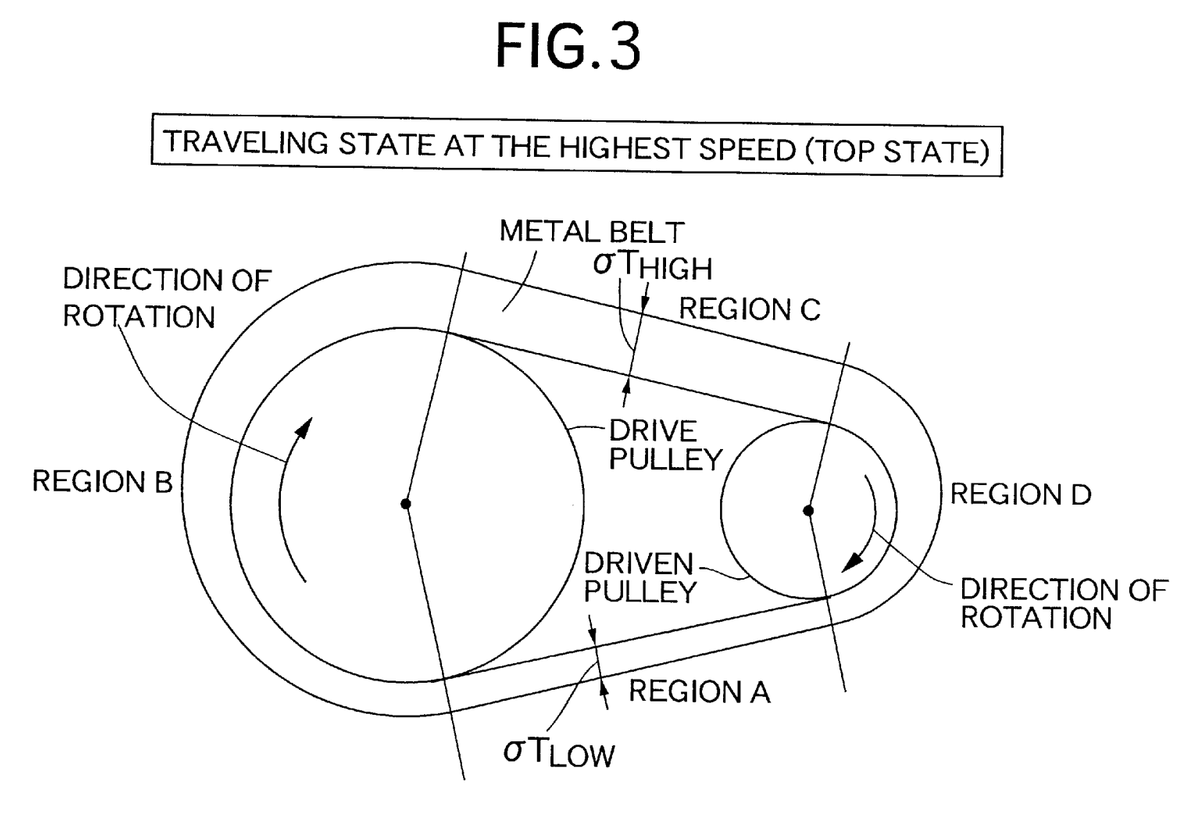
FIG. 3 is a view for explaining a tensile stress applied to a metal ring.

FIG. 3 shows a state in which the effective radius of the drive pulley 6 is larger than that of the driven pulley 11 with the vehicle being in a state in which it is traveling at the highest speed (TOP state). The thickness of the metal belt 15 in FIG. 3 diagrammatically represents the magnitude of the tensile stress applied to each of the metal rings 33 due to the tension of the metal belt 15. In a returning-side chord portion (a region A) in which the metal belt 15 is returned from the driven pulley 11 to the drive pulley 6, such stress is of a given value $\sigma T_{LOW}$, and in an advancing-side chord portion (a region C) in which the metal belt 15 is delivered from the drive pulley 6 to the driven pulley 11, such stress is of a given value $\sigma T_{HIGH}$. The stress $\sigma T_{LOW}$ in the region A is smaller than the stress $\sigma T_{HIGH}$ in the region C. In a section (a region B) in which the metal belt 15 is wound around the drive pulley 6, the stress is increased from the value $\sigma T_{LOW}$ to the value $\sigma T_{HIGH}$ from the inlet side to the outlet side. In a section (a region D) in which the metal belt 15 is wound around the driven pulley 11, the stress is decreased from the value $\sigma T_{HIGH}$ to the value $\sigma T_{LOW}$ from the inlet side to the outlet side.

The tension of the metal belt 15 is equally shared by the pair of metal ring assemblies 31, 31, and the tension of each of the metal ring assemblies 31 is shared by the twelve metal rings 33 constituting the metal ring assembly 31. In this case, the stresses of the eleven metal rings 33 second to twelfth from the inside, excluding the innermost metal ring 33 which is in contact with a saddle surface $32_1$ of the metal element 32, are equal to one another, but the stress of the innermost metal ring 33 assumes a value different from the stresses of the second to twelfth metal rings 33. The reason will be described below with reference to FIG. 4.

Figure 4:
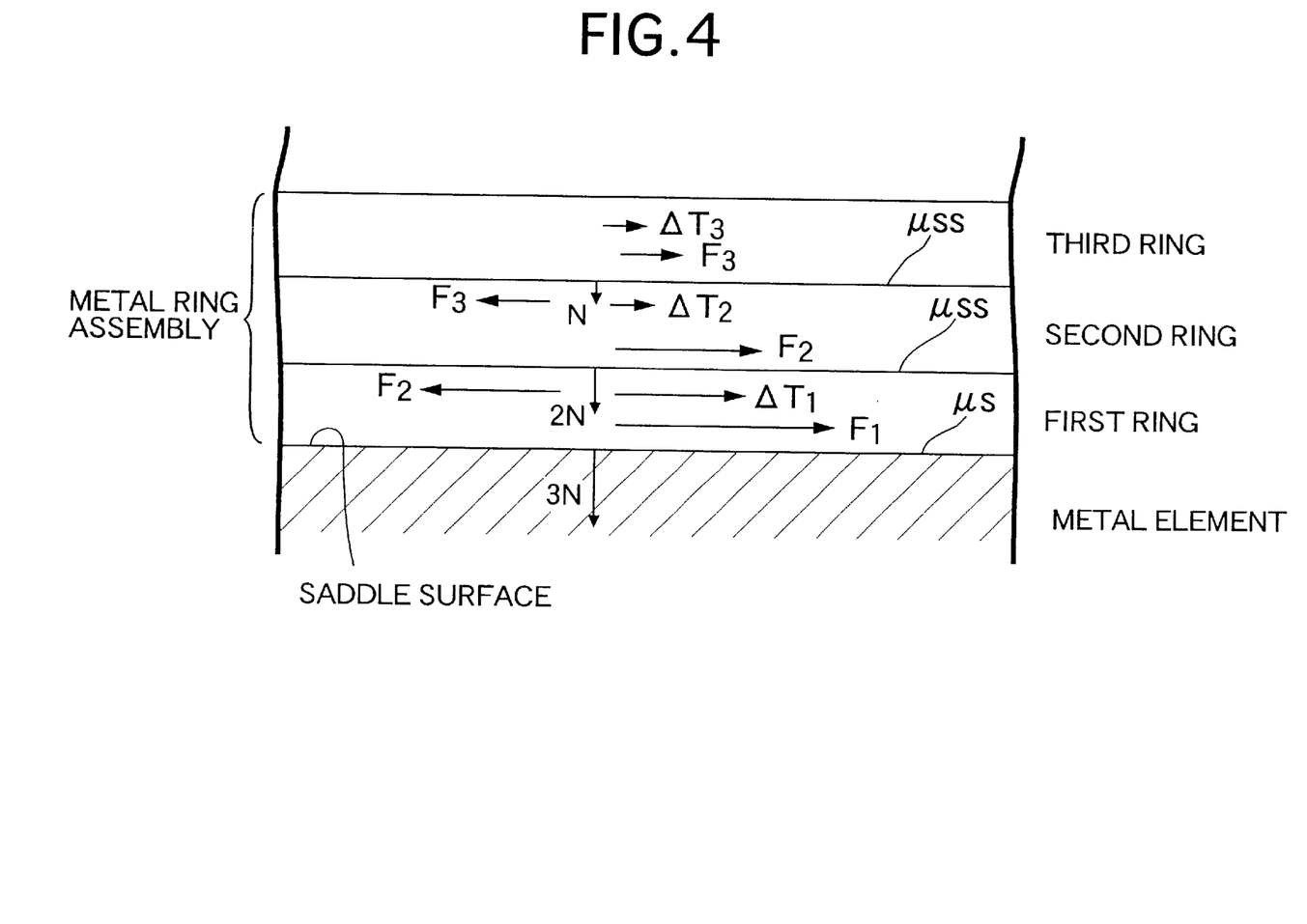
FIG. 4 is a diagram showing the balance of a force applied to the metal ring.

First, a case where the metal ring assembly comprises three metal rings will be considered as a simple model. If a vertical drag acting between the outermost, third ring and the inner, second ring in a pulley-wound zone is represented by N, a vertical drag acting between the second ring and the first ring is equal to 2N, and a vertical drag acting between the first ring and the saddle surface of the metal element is equal to 3N. Here, if a friction coefficient between the metal rings which are in contact with each other (which will be referred to as a ring-ring friction coefficient hereinafter) is represented by $\mu_{ss}$; a friction coefficient between the metal ring and the metal element (which will be referred to as a ring-element friction coefficient hereinafter) is represented by $\mu_s$; and loads of the first, second and third rings are represented by $F_1$, $F_2$ and $F_3$, respectively, amounts $\Delta T_1$, $\Delta T_2$ and $\Delta T_3$ of variation in tension on the metal rings are given according to the following equations (1), (2) and (3):

$$\Delta T_3 = F_3 = \mu_{ss} N \tag{1}$$

$$\Delta T_2 = F_2 - F_3 = 2\mu_{ss}N - \mu_{ss}N\mu_{ss}N \tag{2}$$

$$\Delta T_1 = F_1 - F_2 = 3\mu_s N - 2\mu_{ss}N \tag{3}$$

Namely, the amounts $\Delta T_2$ and $\Delta T_3$ of variation in tension on the second and third rings having the equal friction coefficients $\mu_{ss}$ of their inner circumferential surfaces are equal to $\mu_{ss}N$, but the amount $\Delta T_1$ of variation in tension acting on the first ring having the friction coefficients of its inner circumferential surface equal to $\mu_s$ is equal to $3\mu_s N - 2\mu_{ss}N$ which is different from the amounts $\Delta T_2$ and $\Delta T_3$.

The ratio of $\Delta T_1$ to $\Delta T_2$ is given by $$\Delta T_1/\Delta T_2 = (3\mu_s N - 2\mu_{ss}N)/\mu_{ss}N \tag{4}$$

and if this equation (4) is extended to a case where the number of laminated metal rings is n, the following equation is given:

$$\Delta T_1/\Delta T_2 = \{n\mu_s - (n-1)\mu_{ss}\}/\mu_{ss} \tag{5}$$

Here, a friction coefficient ratio which is a ratio of the ring-element friction coefficient $\mu_s$ to the ring-ring friction coefficient $\mu_{ss}$ is represented by $\xi$ ($=\mu_s/\mu_{ss}$), the equation (5) can be rewritten as follows:

$$\Delta T_1/\Delta T_2 = n\xi - (n-1) = n(\xi - 1) + 1 \tag{6}$$

The sum total $\Delta T_{ALL}$ of the amounts $\Delta T_1$ to $\Delta T_n$ of variation in tension on the n sheets of metal rings constituting a metal ring assembly is given by $$\begin{aligned}\Delta T_{ALL} &= \Delta T_1 + \Delta T_2 + \cdots + \Delta T_{12} \\ &= (n-1)\Delta T_2 + \Delta T_1 \\ &= (n-1)\Delta T_2 + \{n(\xi-1)+1\}\Delta T_2 \\ &= n\xi\Delta T_2\end{aligned} \tag{7}$$

and therefore, if $\Delta T_2$ is eliminated from the equations (6) and (7), the following equation is given:

$$\Delta T_1/\Delta T_{ALL} = \{n(\xi-1)+1\}/n\xi \tag{8}$$

The equation (8) indicates that if the number n of the laminated metal rings included in the metal ring assembly is determined, and the friction coefficient ratio $\xi$ which is the ratio of the ring-element friction coefficient $\mu_s$ to the ring-ring friction coefficient $\mu_{ss}$ is determined, the ratio of the amount $\Delta T_1$ of variation in tension on the innermost metal ring to the amount $\Delta T_{ALL}$ of variation in tension on the entire metal ring assembly is determined.

Figure 5:
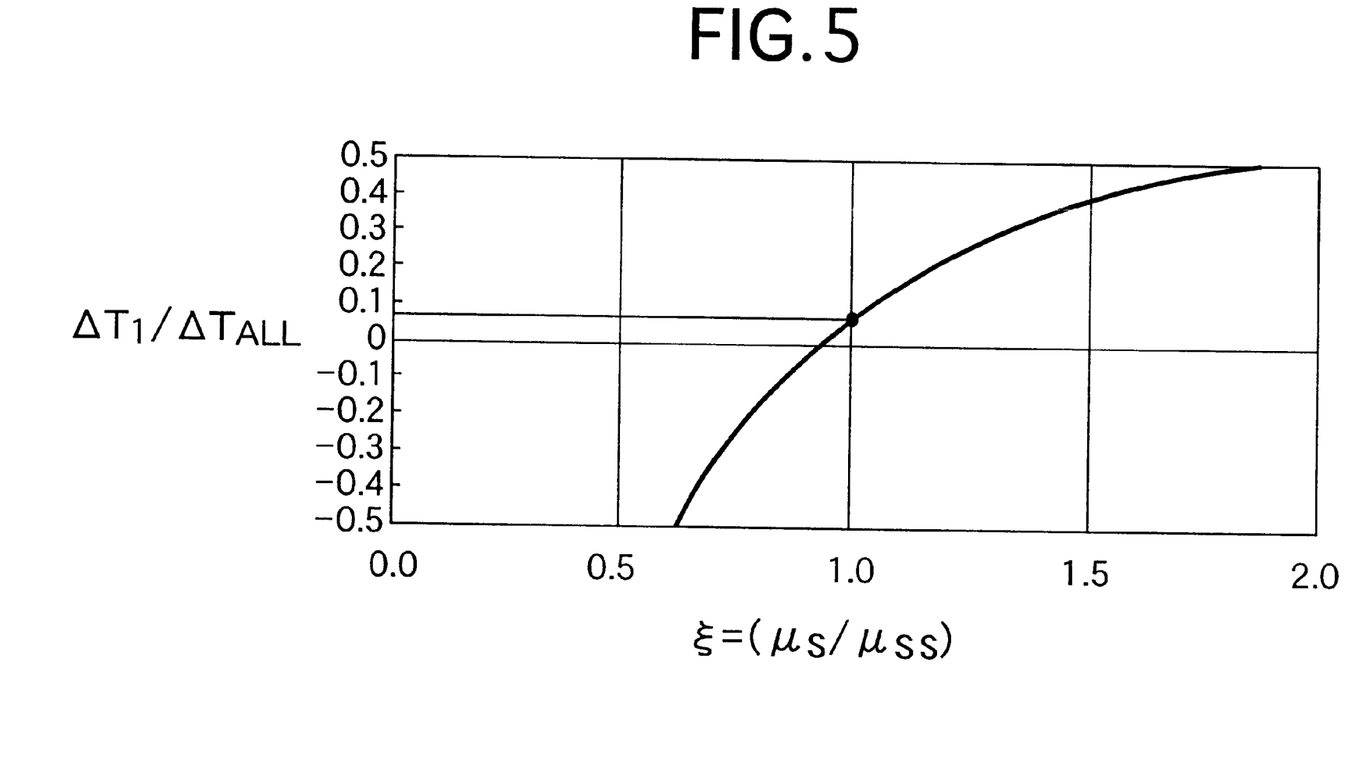
FIG. 5 is a graph showing a variation in $\Delta T_1/\Delta T_{ALL}$ with respect to a friction coefficient ratio $\xi$.

The graph in FIG. 5 shows the result of the calculation of the value $\Delta T_1/\Delta T_{ALL}$ about various friction coefficients $\xi$ in a case where the metal ring assembly is constituted of twelve metal rings (i.e., n=12). The past experience and the actual measurement result show that if rings identical to the innermost metal ring are employed as the other metal rings, the ring-element friction coefficient $\mu_s$ is a value larger than the ring-ring friction coefficient $\mu_{ss}$ and hence, the friction coefficient ratio $\xi = \mu_s/\mu_{ss}$ is larger than 1.0.

Supposing that the ring-ring friction coefficient $\mu_{ss}$ and the ring-element friction coefficient $\mu_s$ are equal to each other, the friction coefficient ratio $\xi$ is equal to 1.0, and $\Delta T_1/\Delta T_{ALL}$ is equal to 0.08. Thus, the innermost metal ring bears the same amount of variation in tension as any of the other eleven metal rings, i.e., about 8% which is one twelfth of the total sum $\Delta T_{ALL}$ of the amounts of variation in tension on the entire metal ring assembly. In practice, however, the friction coefficient ratio $\xi$ assumes a value larger than 1.0 and for this reason, the amount $\Delta T_1$ of variation in tension on the innermost metal ring is larger than the amount $\Delta T_n$ (which is constant about the eleven metal rings) of variation in tension on any of the other eleven metal rings.

Figure 7:
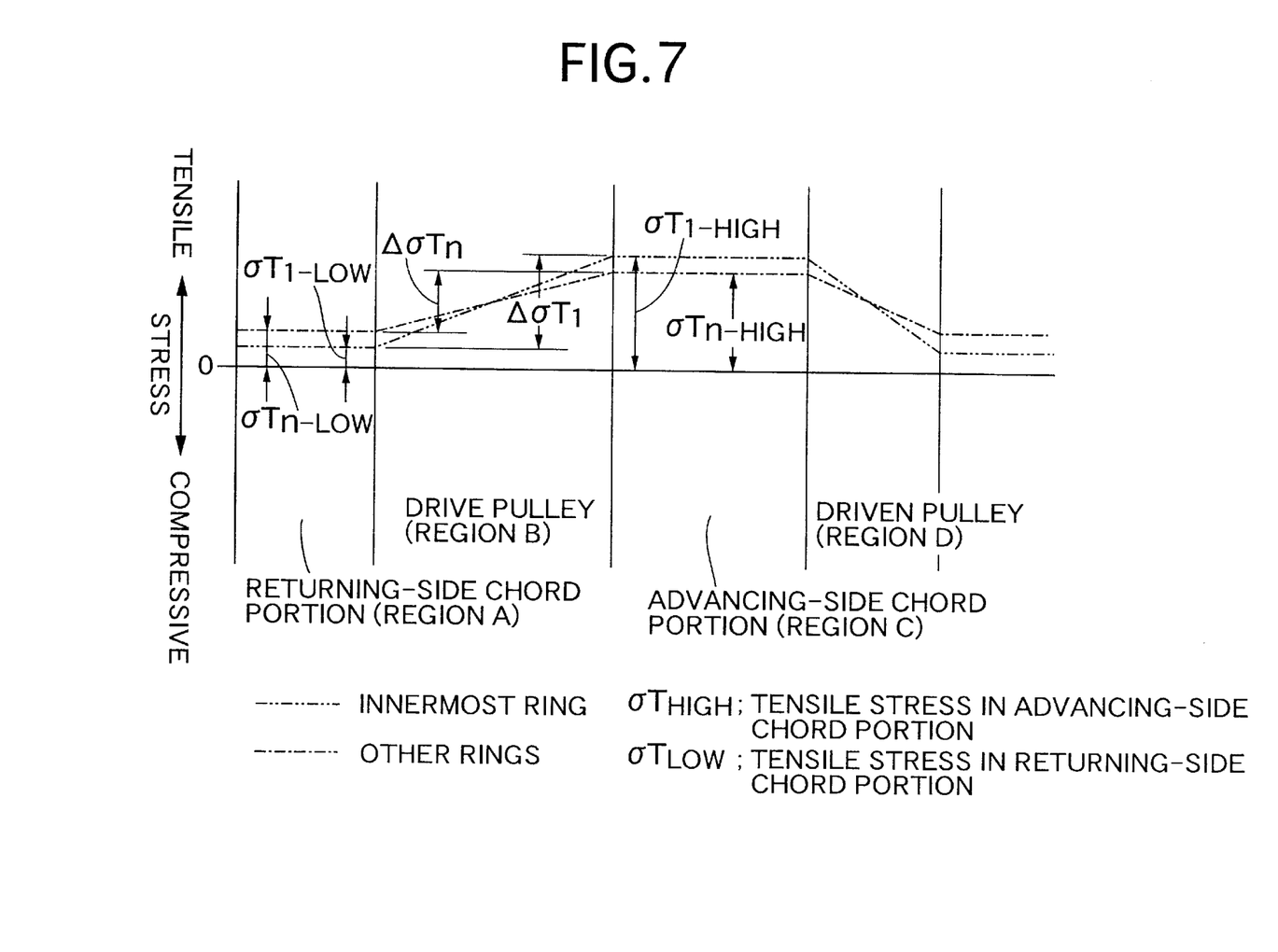
FIG. 7 is a graph showing a variation in the tensile stress applied to an inner circumferential surface of the metal ring.

The graph in FIG. 7 shows the variation in tensile stress $\sigma T_1$ on the innermost metal ring and the variation in tensile stress $\sigma T_n$ on each of the other eleven metal rings, when the vehicle is in the highest-speed traveling state described with reference to FIG. 3. A two-dot dashed line in FIG. 7 indicates the variation in tensile stress $\sigma T_1$ on the innermost metal ring, and a one-dot dashed line indicates the variation in tensile stress $\sigma T_n$ on each of the other eleven metal rings other than the innermost metal ring. Due to the discord between the ring-element friction coefficient $\mu_s$ and the ring-ring friction coefficient $\mu_{ss}$ described above, the amount $\Delta T_1$ of variation in tension on the innermost metal ring (namely, the amount $\Delta\sigma T_1$ of variation in stress) is larger than the amount $\Delta T_n$ of variation in tension on any of the other metal rings (namely, the amount $\sigma T_{1-LOW}$ of variation in stress); the minimum tensile stress $\sigma T_{1-LOW}$ of the innermost metal ring in the returning-side chord portion (the region A) is smaller than the minimum tensile stress $\sigma T_{n-LOW}$ on the other metal rings, and the maximum tensile stress $\sigma T_{1-HIGH}$ of the innermost metal ring in the advancing-side chord portion (the region C) is larger than the maximum tensile stress $\sigma T_{n-HIGH}$ on the other metal rings.

Figure 6A:
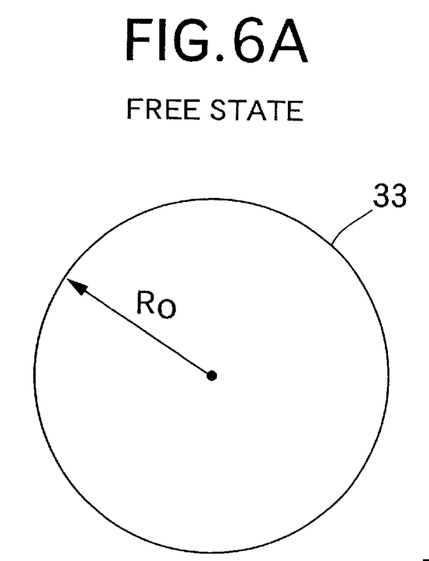
FIGS. 6A and 6B are diagrams explaining the shapes of the metal ring in a free state and in a service state.
Figure 6B:
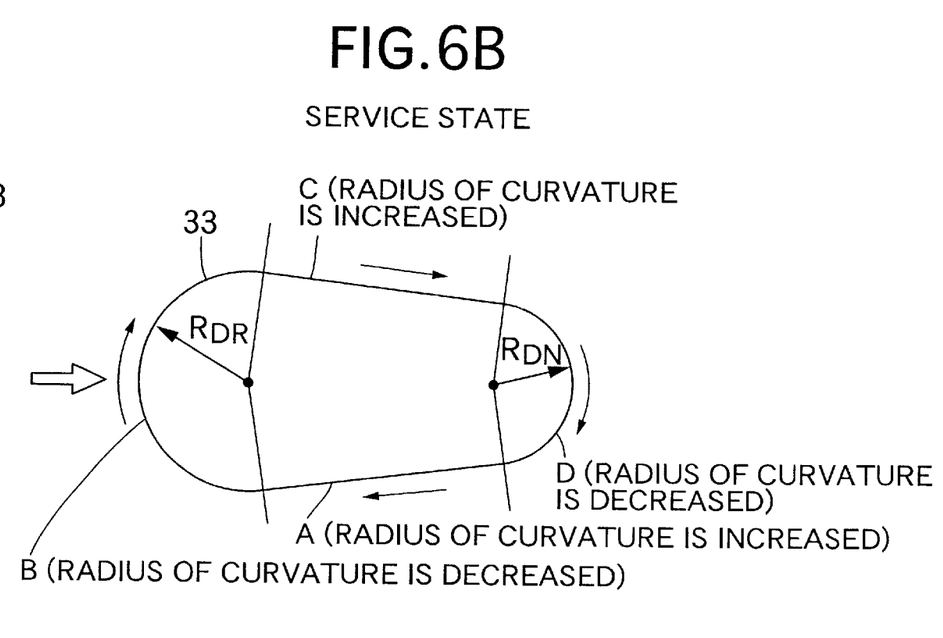

A tensile stress and a compressive stress based on the bending of the metal ring are applied to the metal ring in addition to the tensile stress based on the tension. As shown in FIGS. 6A and 6B, the metal ring in a free state is circular, but the metal ring in a service state is deformed into a shape having the regions A, B, C and D. In the returning-side chord portion (the region A) and in the advancing-side chord portion (the region C), a radius of curvature which is $R_0$ in the free state is increased infinitely ($\infty$). In the region B in which the metal belt is wound around the large-diameter drive pulley, the radius of curvature which is $R_0$ in the free state is decreased to $R_{DR}$. In the region D in which the metal belt is wound around the small-diameter driven pulley, the radius of curvature which is $R_0$ in the free state is decreased to $R_{DN}$.

In the regions A and C in which the radius of curvature of the metal ring is increased, a tensile bending stress is applied to the inner circumferential surface of the metal ring, and a compressive bending stress is applied to the outer circumferential surface of the metal ring. On the other hand, in the regions B and D in which the radius of curvature of the metal ring is decreased, a compressive bending stress is applied to the inner circumferential surface of the metal ring, and a tensile bending stress is applied to the outer circumferential surface of the metal ring. Each of the compressive bending stress and the tensile bending stress is of the same value in the innermost metal ring and the other metal rings.

Figure 8:
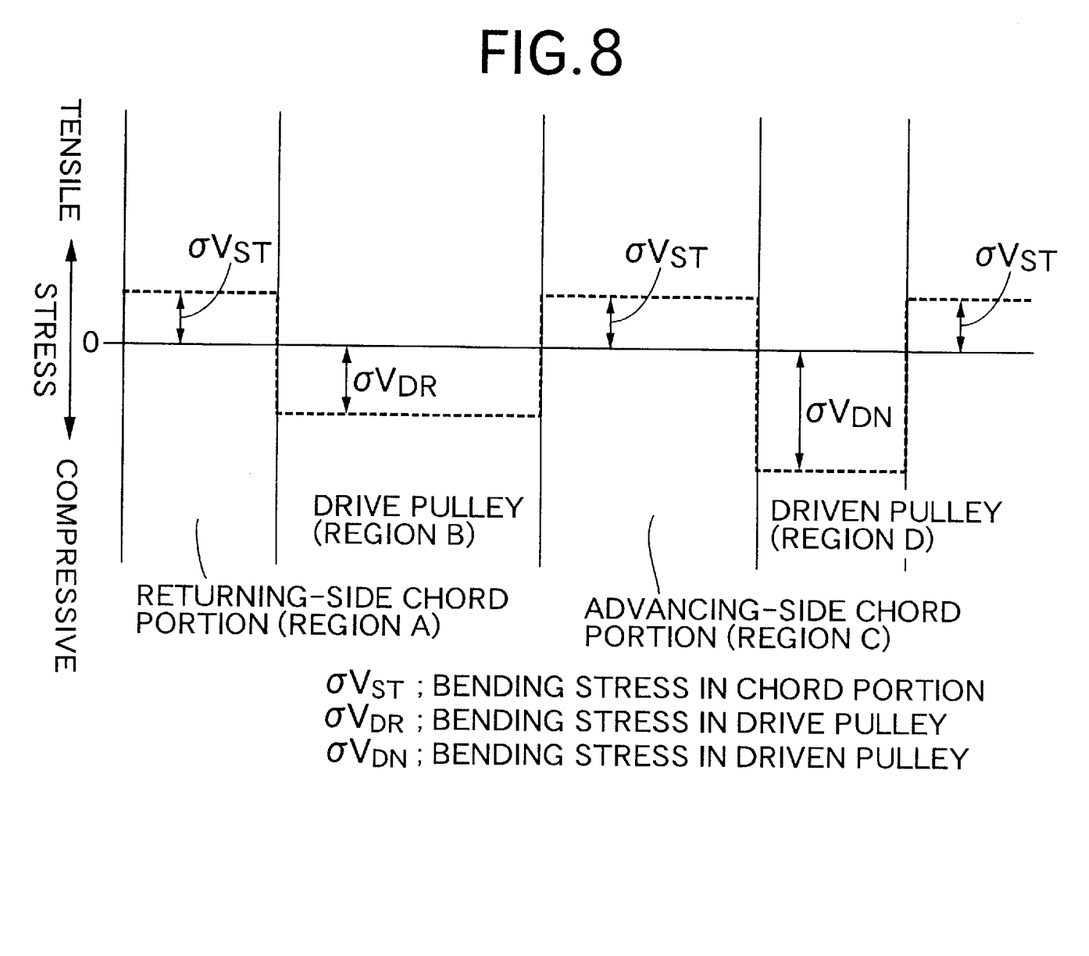
FIG. 8 is a graph showing a variation in a bending stress applied to the inner circumferential surface of the metal ring.

The graph in FIG. 8 shows the bending stresses applied to the inner circumferential surfaces of the twelve metal rings, when the vehicle is in the highest-speed traveling state described with reference to FIG. 3. As can be seen from FIG. 8, a tensile bending stress $\sigma V_{ST}$ which is constant in the two chord portions (the regions A and C) is applied to the inner circumferential surface of each of the metal rings. In the region B in which the metal belt is wound around the drive pulley having the larger radius of curvature, a relatively small compressive bending stress $\sigma V_{DR}$ is applied to the inner circumferential surface of each of the metal rings. In the region D in which the metal belt is wound around the driven pulley having the smaller radius of curvature, a relatively large compressive bending stress $\sigma V_{DN}$ is applied to the inner circumferential surface of each of the metal rings.

Figure 9:
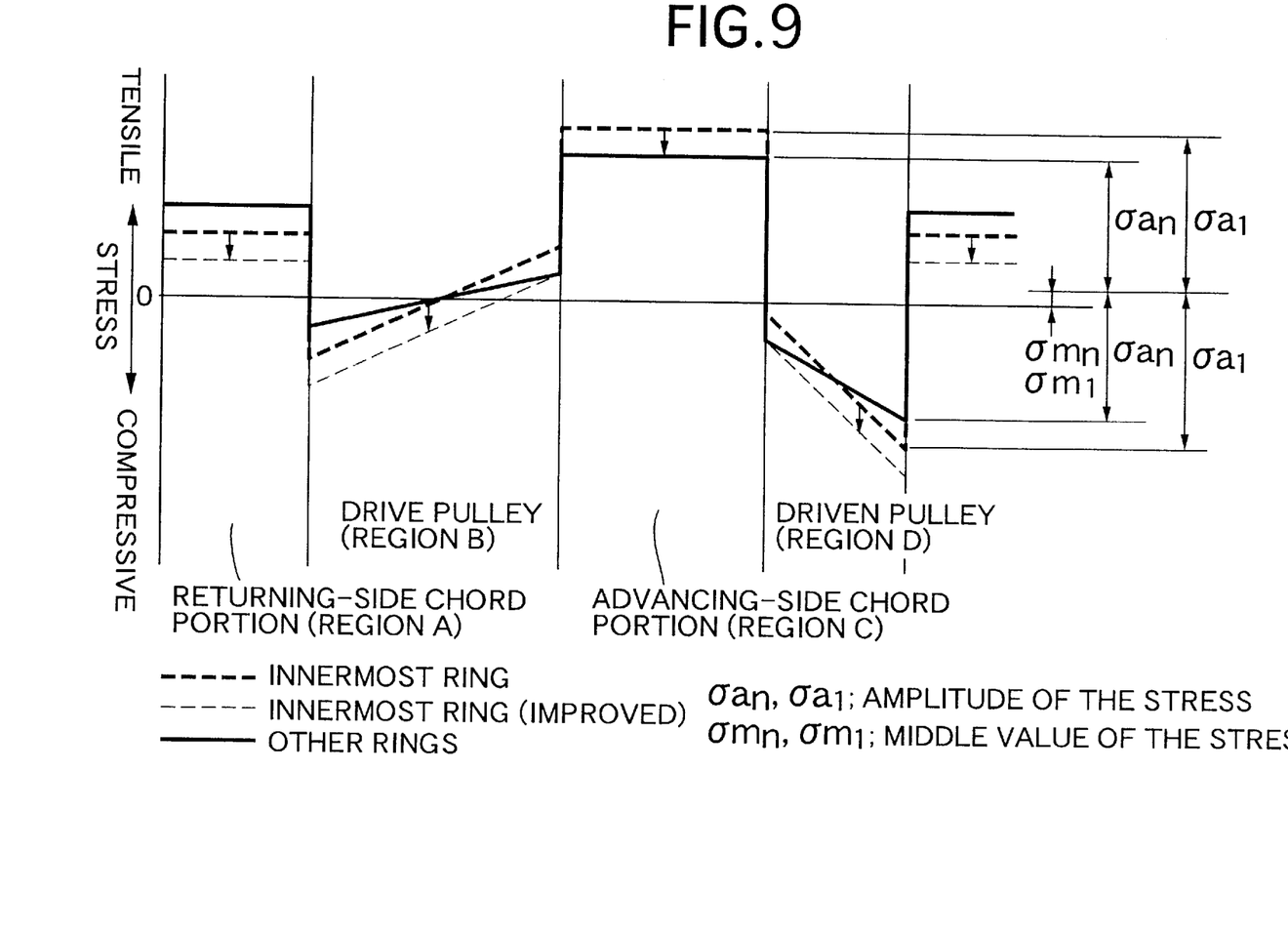
FIG. 9 is a graph showing a variation in total stress applied to the inner circumferential surface of the metal ring.

The graph in FIG. 9 shows a total stress resulting from the addition of two stresses: (1) the stress shown in FIG. 7 and applied to the metal ring based on the tension of the metal ring and (2) the stress shown in FIG. 8 and applied to the inner circumferential surface of the metal ring based on the bending of the metal ring. In FIG. 9, a bold dashed line indicates a variation in total stress applied to the inner circumferential surface of the innermost metal ring, and a solid line indicates a variation in total stress applied to the inner circumferential surfaces of the other metal rings. As can be seen from FIG. 9, the middle value $\sigma m_1$ of the stress on the innermost metal ring and the middle value $\sigma m_n$ of the stress on the other metal rings are equal to each other, but the amplitude $\sigma a_1$ of the stress on the innermost metal ring is larger than the amplitude $\sigma a_n$ of the stress on the other metal rings. A deviation between the amplitudes $\sigma a_1$ and $\sigma a_n$ of both the stresses is due to the deviation between the amount $\Delta\sigma T_1$ of variation in stress on the innermost metal ring and the amount $\Delta\sigma T_n$ of variation in stress on the other metal rings described with reference to FIG. 7.

As a result, the fatigue life of the innermost metal ring is shorter than those of the other metal rings, and there is an increased possibility that the life of the metal belt may come to an end due to the breakage of the innermost metal ring. Therefore, if the middle amplitude value $\sigma m_1$ of the innermost metal ring approaches 0 (zero) as shown by a fine dashed line in FIG. 9, the deviation between the maximum value of the tensile stress and the maximum value of the compressive stress is decreased and hence, the fatigue life of the innermost metal ring is prolonged to approach or accord with the fatigue life of the other metal rings, whereby the life of the entire metal belt can be prolonged. The middle amplitude value $\sigma m_1$ of the innermost metal ring is deviated toward the tension side from 0 (zero). For this reason, if a compressive residual stress is applied to at least the inner circumferential surface of the innermost metal ring, the middle value $\sigma m_1$ of the stress on the innermost metal ring can be brought close to 0 (zero).

Figure 10:
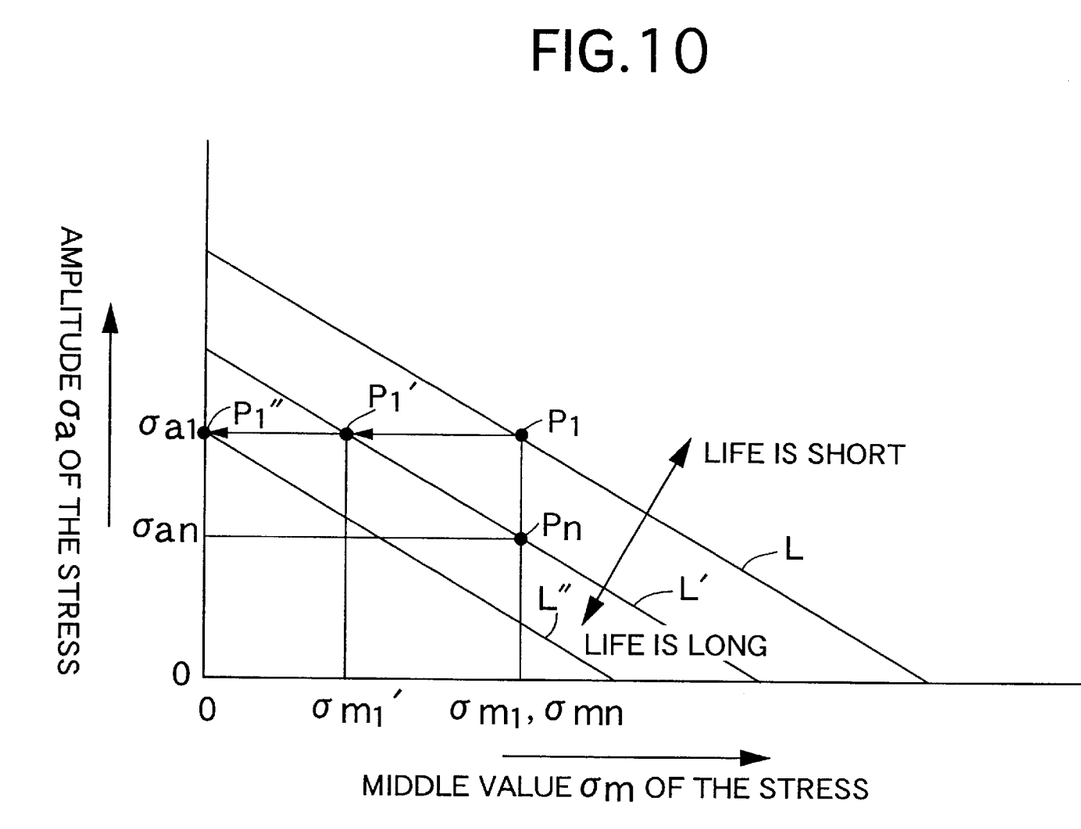
FIG. 10 is a graph showing equi-life lines of the metal ring.

FIG. 10 is a graph with the middle value $\sigma m$ of stress taken on the axis of abscissa and the stress amplitude $\sigma a$ taken on the axis of ordinate. In FIG. 10, each of points on the same equi-life line indicates a combination of the middle value am of stress and the amplitude $\sigma a$ of stress in which the fatigue lives are equal to each other. A point $P_1$ on an equi-life line L corresponds to the stressed state of the innermost metal ring, and a point $P_n$ on an equi-life line L' corresponds to the stressed state of the other metal rings. The innermost metal ring shown by $P_1$ has the fatigue life which is smaller by a degree corresponding to that the stress amplitude $\sigma a_1$ thereof is larger than the stress amplitude $\sigma a_n$ of the other metal rings. At this time, if the middle value of the stress on the innermost metal ring is decreased from $\sigma m_1$ toward 0 (zero) to become equal to $\sigma m_1'$, the stressed state $P_1$ of the innermost metal ring is moved from the equi-life line L to a point $P_1'$ on the equi-life line L' of the other metal rings. As a result, all of the twelve metal rings ride on the same equi-life line L', whereby the fatigue lives thereof are equal to one another and thus, the durability of the entire metal belt is enhanced.

If the middle value of the stress on the innermost metal ring is decreased from $\sigma m_1$ to 0, the stressed state $P_1$ of the innermost metal ring is moved from the equi-life line L to a point $P_1''$ on an equi-life line L'' with a further larger fatigue life. As a result, the fatigue life of the innermost metal ring is further prolonged. At the same time, if the middle value of the stress on the other metal rings is decreased from $\sigma m_n$ toward 0, whereby the other metal ring is allowed to ride on the equi-life line L'', the durability of the entire metal belt can be further effectively enhanced.

To decrease the middle values $\sigma m_1$ and $\sigma m_n$ of the stress on the metal rings, the compressive residual stress may be applied to at least the inner circumferential surface of the metal ring. An example of a particular measure for applying the compressive residual stress is a method of bombarding very small particles to the surface of the metal ring by a shot blast or a water jet. Especially, if glass spheres having a small diameter are mixed to water when the water jet is provided, the compressive residual stress can be applied to the metal ring without creation of a gash in the surface of the metal ring by fracturing the glass spheres by the shock of the bombardment.

Although the embodiment of the present invention has been described in detail, it will be understood that the present invention is not limited to the above-described embodiment, and various modifications in design may be made without departing from the subject matter of the invention defined by the claims.

For example, another measure such as a rolling and a thermal treatment may be used as the measure for applying the compressive residual stress to the metal ring. In addition, as is disclosed in Japanese Patent Application Laid-open No. 2-154834, a method of spraying fluid which is obtained by mixing breakage-resistant particles and liquid together may also be employed as the method of applying the compressive residual stress to the metal ring.

What is claimed is:

1. A belt for a continuously variable transmission, comprising a large number of metal elements carried on metal ring assemblies each of which is comprised of a plurality of endless metal rings laminated one on another, wherein a compressive residual stress is applied to at least an inner circumferential surface of an innermost one of the metal rings which is in contact with a saddle surface of the metal element, said compressive residual stress applied to the innermost metal ring being larger than a compressive residual stress applied to the metal rings other than the innermost metal ring.

2. A belt for a continuously variable transmission according to claim 1, wherein said compressive residual stress is applied to at least the inner circumferential surface of the innermost metal ring, so that a fatigue life defined by an amplitude $\sigma a_1$ and a middle value $\sigma m_1$ of a stress on the inner circumferential surface of the innermost metal ring is equal to a fatigue life defined by an amplitude $\sigma a_n$ and a middle value $\sigma m_n$ of a stress on the inner circumferential surfaces of the metal rings other than the innermost metal ring.

* * * * *